United States Patent

[11] 3,608,965

[72] Inventors Kurt Cziptschirsch;
 Gunter Dietz, both of Wuppertal-Barmen, Germany
[21] Appl. No. 835,013
[22] Filed June 20, 1969
[45] Patented Sept. 28, 1971
[73] Assignee Gebr. Happich G.m.b.H.
 Wuppertal-Elberfeld, Germany
[32] Priority July 16, 1968
[33] Germany
[31] P 17 79 181.0

[54] AUTOMOTIVE VEHICLE HEAD AND NECK REST
 8 Claims, 5 Drawing Figs.

[52] U.S. Cl. .................................................. 297/410,
 248/423
[51] Int. Cl. ..................................................... A47c 7/36,
 A47c 7/42
[50] Field of Search .......................................... 297/391,
 397, 410; 248/407, 408, 423; 108/146; 287/58 CT

[56] References Cited
 UNITED STATES PATENTS
 3,328,082 6/1967 Lilleso .......................... 297/397 X
 3,507,538 4/1970 Stoller .......................... 297/397 X FOREIGN PATENTS
 19,177 1914 Great Britain ................ 248/408

Primary Examiner—Casmir A. Nunberg
Attorney—Ostrolenk, Faber, Gerb & Soffen

ABSTRACT: Automobile seat headrest having a curved, approximately wedge-shaped in side cross section, cushioned body, with a narrow curved top edge and a wide curved bottom edge; supporting rods extending into the body and being connected thereto by pivot support means which permit pivoting of the headrest; a sector shaped insert in the cushioned body, through which the supporting rods pass, the walls defining the sector serving as the limit stops for the pivoting motion of the body; an auto seat includes a bushing for each supporting rod, which bushing has a break in the walls thereof to permit the arms of a detent spring to mass through the walls and engage in one of the detent grooves on the supporting rod; the detent grooves face downward to impede downward headrest movement.

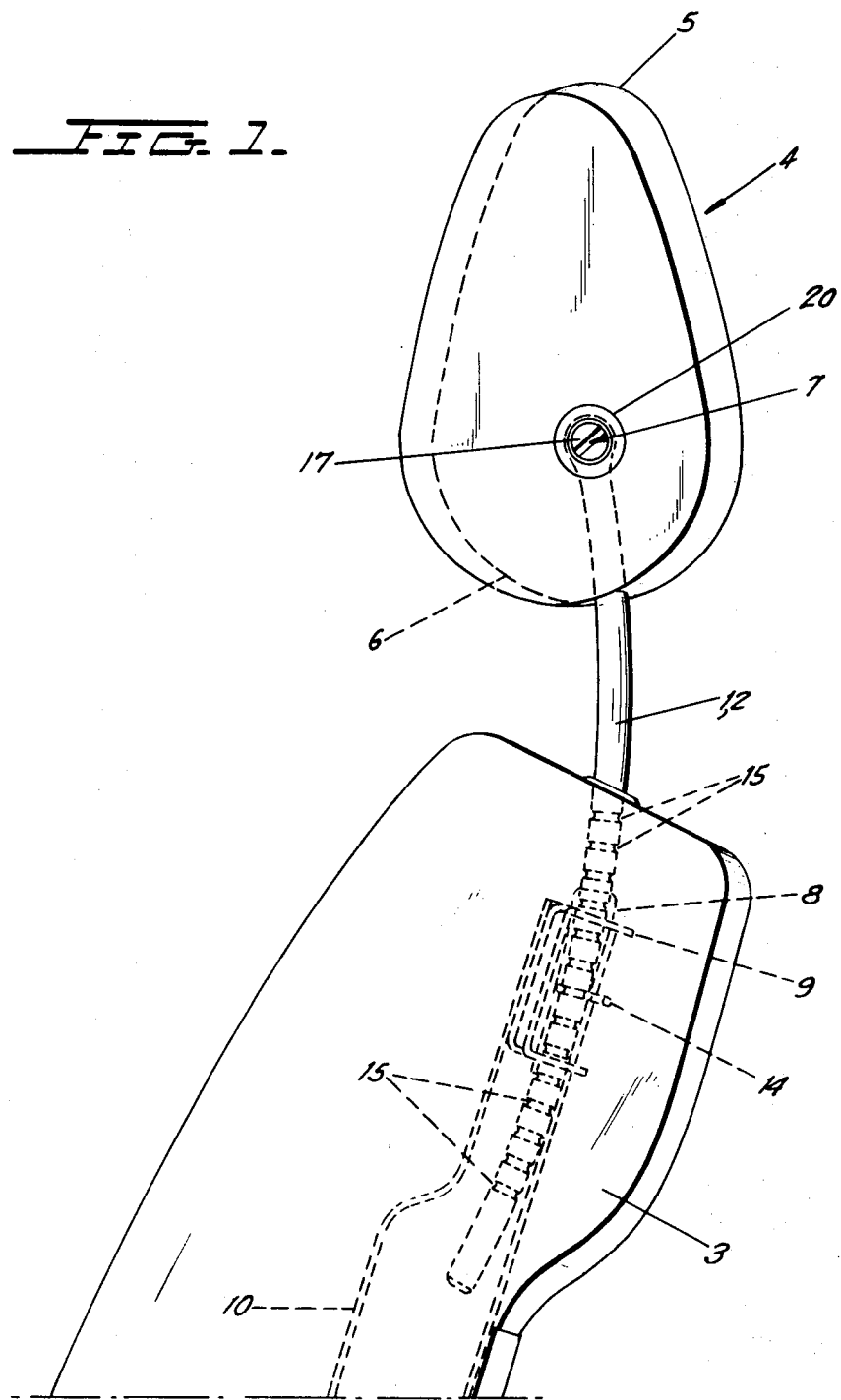

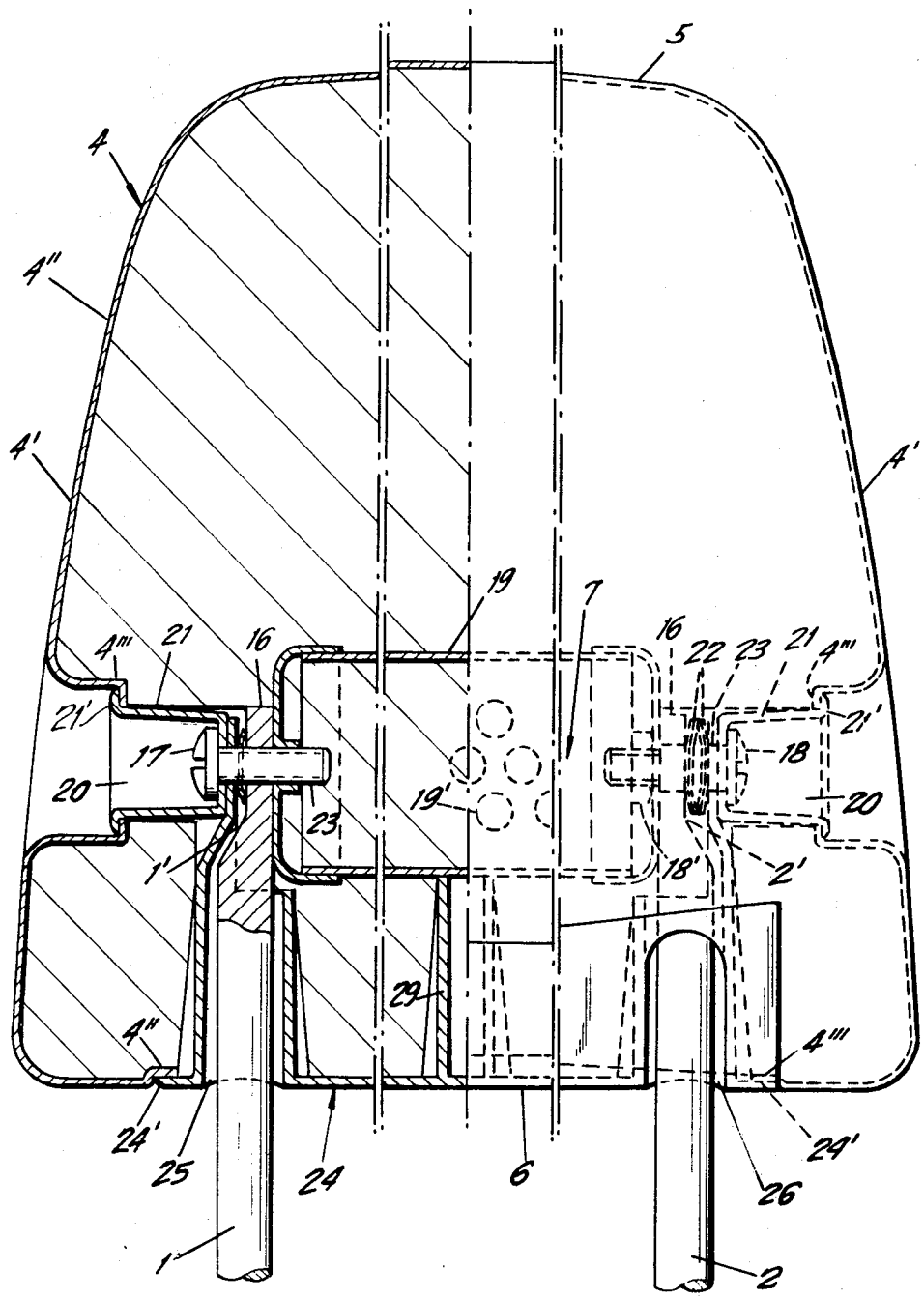

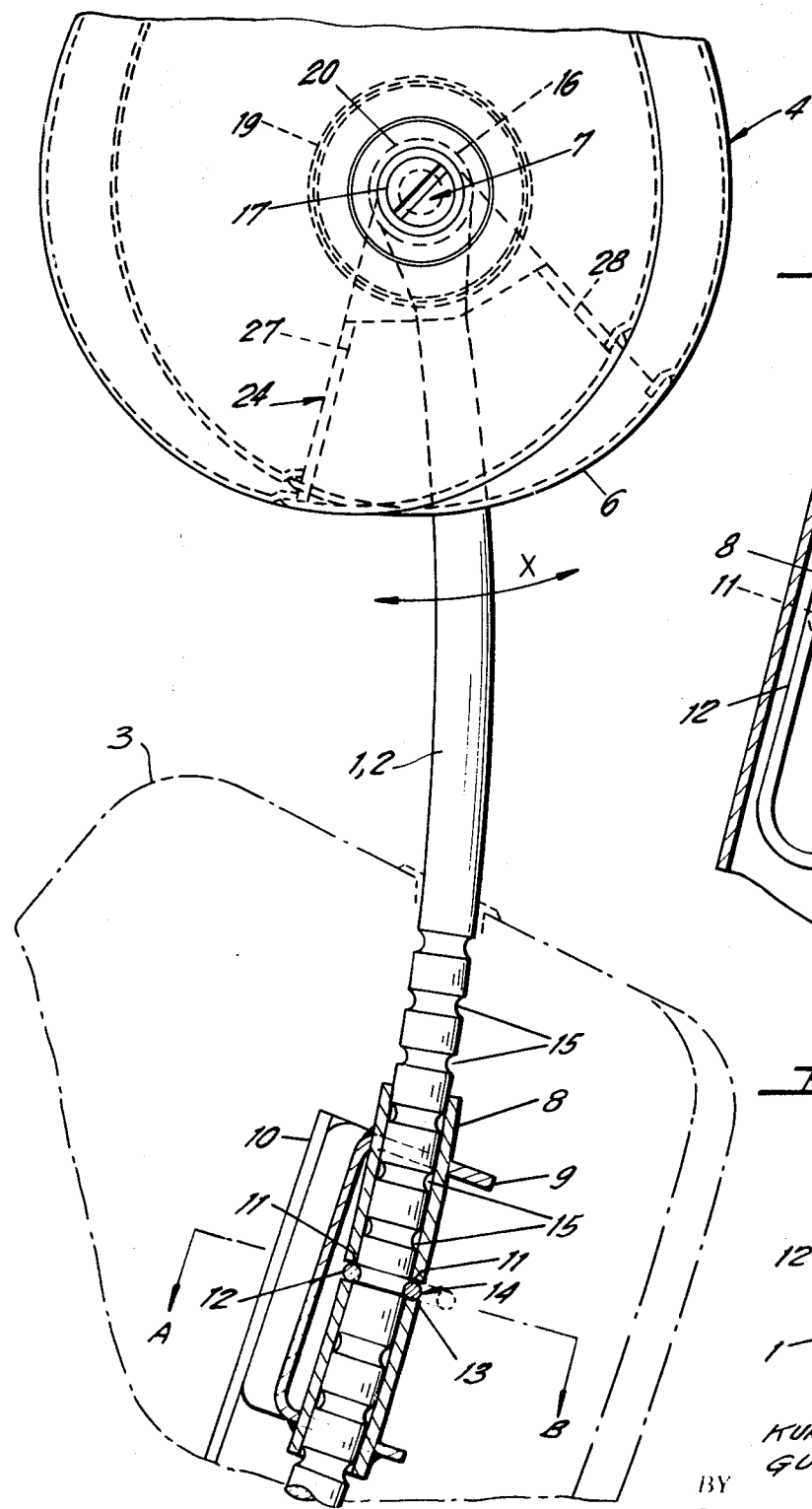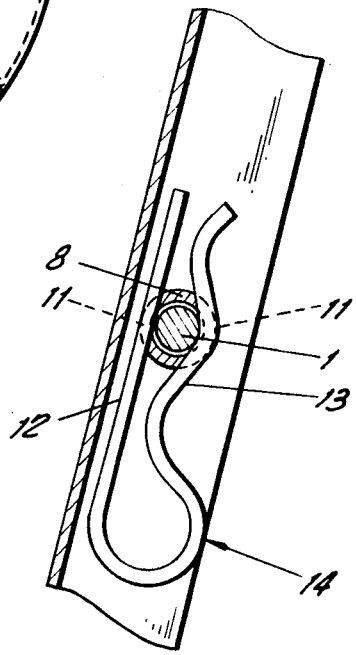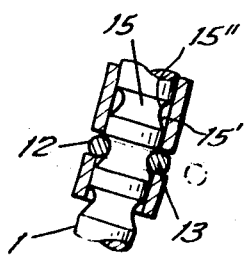

AUTOMOTIVE VEHICLE HEAD AND NECK REST

The present invention relates to a head and neck rest, particularly for the seat of an automotive vehicle, which headrest is provided with a cushioned body that is pivotally supported on preferably vertically adjustable supporting rods.

It is an object of the present invention to provide a head and neck rest of this type, which is easily manufactured and is stable in itself, and which is adjustable so that the user can optionally select one among differently shaped head and neck-supporting surfaces.

In accordance with the invention, the cushioned body of the head and neck rest has a wedge-shaped side cross section with a rounded narrow top edge and with an approximately circular rear edge, and with the pivot axis between the cushioned headrest body and its supporting rods lying in approximately the center of the rear arc of curvature. The cushioned body is additionally curved along the longitudinal dimension.

The two head rest supporting rods enter the cushioned body of the head rest in the region of its rounded back edge and are pivotally connected there by transversely extending pivot pins. The pins are, in turn, secured to a preferably tubular stabilization insert which is formed into the cushioned body. Preferably, the pivot pins are accessible from the outside of the cushioned body through depressions which open toward the transverse sides of the cushioned headrest body.

An insert having a sector-shaped headrest section extends from the rounded rear edge of the headrest up to the pivot pins. The insert forms the entrances for the supporting rods, and its sidewalls form the limiting stops for the pivoting motion of the cushioned body.

The headrest-supporting rods are curved along their longitudinal dimensions and are each guided in a bushing with which there is associated a detent spring. The arms of each spring engage through the walls of a bushing into cooperating detent grooves on a supporting rod. The supporting rod grooves preferably open downward to ease raising and impede lowering of the headrest.

The user of the head and neck rest, by pivotally adjusting the cushioned body relative to the supporting rods and/or by vertically adjusting the supporting rods themselves, can select the most favorable resting surface. He can, for instance, place his head and/or neck in front of the wide surface of the cushioned body. Alternatively, the rear edge/arc of curvature of the wedge-shaped cushioned body can be placed in the region of the user's neck with only the back of the head resting on the less-curved wide surface. Finally, the narrow-edged upper surface can be employed as a neck support. The curvature of the cushioned body in its longitudinal dimension corresponds in particular to a good support for the rear of the head.

The inner construction of the head support is advantageous from the standpoint of manufacturing technique, as it permits easy assembling of the headrest and results in a high degree of stability.

The cushioned body as a whole can be foamed in its final shape, with the stabilizing insert for the pivot pins of the supporting rods being fixed in the most favorable region of the cushioned body.

The sector-shaped insert is preferably dependably secured to the pivot pins and it holds the entrances for the supporting rods open from the front in the case of manufacture of the cushioned body by the foaming process.

The position of the pivot pins, and their being accessible only toward the sides of the cushioned body, is advantageous from he standpoint of assembly and provides good protection in the case of accidents. The curved alignment of the supporting rods and their simple bushing guidance and detent spring locking are also advantageous from the standpoint of manufacture and use, particularly in obtaining the greatest variety of head and neck-supporting surfaces. The invention is shown in one illustrative embodiment in the accompanying drawings in which:

FIG. 1 is a side elevation of the headrest designed in accordance with the invention provided on an automobile seat;

FIG. 2 is a rear view of the headrest, partially in section;

FIG. 3 is a side view of the headrest;

FIG. 4 is a section along the line A–B of FIG. 3; and

FIG. 5 shows another embodiment of the detent grooves.

The head and neck rest of the invention has a cushioned body 4 which is held by supporting rods 1 and 2 on the back 3 of an automobile seat.

Cushioned body 4 has a wedge-shaped side cross section (FIG. 1). The narrow upper edge 5 of this wedge is rounded. The rear, lower edge 6 of this wedge is also rounded with an approximately circular course. The pivot pin 7 between the supporting rods 1 and 2 and the cushioned body 4 is seated approximately at the center of the arc of curvature of rear edge 6. The cushioned body is also curved along its longitudinal dimension.

Both of supporting rods 1 and 2 are curved along their longitudinal dimension. Each supporting rod is guided in a bushing 8, which is fastened rigidly to the crossmember 9 of the seat back inner frame 10 of the car seat back 3. Each bushing 8 is bent in accordance with the radius of curvature of the supporting rods 1 and 2.

The central region of the wall of bushing 8 has two slots 11 located opposite each other. The arms 12 and 13 of a hairpin-shaped detent spring 14 extend through slots 11. Arms 12 and 13 also enter the detent grooves 15 in each supporting rod.

Supporting rods 1 and 2 can be displaced easily with continuous stepwise detenting in the bushings 8 to different vertical positions with respect to seat back 3. As a result of the longitudinal curvature of supporting rods 1 and 2, when cushioned headrest body 4 is displaced, it is shifted somewhat more forward or rearward.

Each supporting rod 1, 2 is provided with an eye 16 on its respective flattened end 1', 2'. The pivot pins 17 and 18 pass through eyes 16.

Flattened ends 1' 2' of the supporting rods 1,2 seat against the end surfaces of a tubular stabilizing insert 19 in the cushioned body 4. Stabilizing insert 19 if foamed in place in the cushioned body. In order to obtain a firm attachment to the cushioning material, the tubular stabilizing insert includes the perforations 19' through which the foam material can flow during the foaming process.

Pivot pins 17 and 18 are within cup-shaped depressions 20 and are accessible from the transverse sides 4' of the cushioned body 4. The depressions are defined by inserted cups 21, which may be closed off from the outside by plugs.

Pivot pin 17 has s threaded surface. It passes through eye 16 of the flattened end 1' and is screwed into a threaded bore hole of the narrow side of stabilizing insert 19. Pivot pin 18, also threaded along its surface, is secured by a nut 18' into insert 19. Pin 18 passes through the cup springs 22 which cause sufficient friction so that any chosen position of the cushioned body 4 will be retained despite expected automotive vehicle vibrations.

The two pivot pins 17, 18 pass furthermore through openings 23 which a are provided on a sector-shaped (see FIG. 3) insert 24 and thereby hold this insert in place. This insert extends from the rounded rear edge 6 into the region of the pivot pins. Insert 24 rests, via the rounded profile 29, on the stabilizing insert 19. The insert includes the two entrances 25, 26 for the supporting rods 1 and 2, respectively. The sidewalls 27 and 28 of each of the entrances form the limiting stops for the pivoting motion of the cushioned body 4 in the directions indicated by double-ended arrow x.

The cushioned body 4 can be provided with an outer covering 4'. In this case, protruding edges 21' of the cup inserts 21 and a protruding edge 24' of the insert 24 surround the edge zones 4''' of this outer covering 4'' which is otherwise firmly connected with the cushioning inner foam.

Detent grooves 15 may merely be in the form of lateral notches. In accordance with FIG. 5, however, grooves 15 have gradually widening downward slops 15' and rapidly widening upward slopes 15' for their exit ramps. This causes grooves 15 to be downwardly extending. Spring arms 12 and 13 readily slide along sloped ramps 15', whereby upward displacement of body 4 is easy. Downward displacement of body 4 is more difficult due to the step shoulders 15'.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

We claim:

1. Head and neck rest for automotive vehicle seat, including
    a cushioned body; said body having a wedge-shaped side cross section, a rounded and narrow upper edge (5), and a circular rear edge (6) and being curved along its longitudinal front surface which confronts the head and neck of the user so as to generally conform to the contour of the head and neck;
    supporting rods connected to said cushioned body by pivot support means; said supporting rods extending into and being supported in the vehicle seat, and being vertically adjustable with respect to the vehicle seat; stop means mounted within said cushioned body and having front and rear walls which cooperate with said supporting rods to limit the forward and rearward movement of said cushioned body.

2. Head and neck rest according to claim 1, wherein said pivot support means is at approximately the center of the arc of curvature of said circular rear edge.

3. Head and neck rest according to claim 1, wherein said pivot support means comprises pivot pins accessible from outside said cushioned body through depressions on the sides of said body.

4. Head and neck rest according to claim 1, wherein said supporting rods enter said cushioned body in the vicinity of said circular rear edge;
    said pivot support means includes a tubular stabilizing insert to which said support rods are pivotally connected; said insert being foam supported in place in said cushioned body.

5. Head and neck rest according to claim 4, wherein said pivot support means comprises pivot pins accessible from outside said cushioned body through depressions on the sides of said body.

6. Head and neck rest according to claim 4, further including
    said stop means comprising an insert having a sector-shaped side cross section, which insert extends from its wider end at said circular rear edge to its narrower end at said pivot support means; said insert forming the entrances for said supporting rods; and the walls of said insert, which walls define its sector shape, also form the limiting stops for the pivoting movement of said cushioned body.

7. In combination, the head and neck rest of claim 1, and an automotive vehicle seat;
    said support rods being curved along their longitudinal dimensions; each said rod being provided with spaced detent grooves, with each groove for receiving a detent spring;
    said seat including a separate bushing for each said support rod; each said support rod passing through a said bushing; each said bushing having openings through its walls for enabling a detent spring to pass therethrough;
    a detent spring for each bushing, which spring includes arms which pass through said bushing wall openings and seat into a said detent groove in the respective said supporting rod to hold said supporting rod against longitudinal shifting.

8. The combination of claim 7, wherein each said detent groove is downwardly extending.